United States Patent [19]

Ohta et al.

[11] Patent Number: 4,587,313

[45] Date of Patent: May 6, 1986

[54] RADIATION CURABLE PRESSURE-SENSITIVE ADHESIVE COMPOSITION

[75] Inventors: Tomohisa Ohta; Akihiko Dobashi, both of Shimodate; Yasuyuki Seki, Hitachi, all of Japan

[73] Assignee: Hitachi Chemical Company, Ltd., Tokyo, Japan

[21] Appl. No.: 673,411

[22] Filed: Nov. 20, 1984

[51] Int. Cl.$^4$ .................. C08F 2/00; C08F 122/10; C08L 33/04; C09J 3/14
[52] U.S. Cl. ..................... 526/75; 526/209; 526/211; 526/214; 526/224; 526/274; 526/278; 526/287; 526/320; 526/321
[58] Field of Search ............ 204/159.22, 159.24; 526/75, 224, 321, 320, 287, 274, 278, 214, 211, 209

[56] References Cited

U.S. PATENT DOCUMENTS

| | | | |
|---|---|---|---|
| 4,049,745 | 9/1977 | Schuster et al. | 204/159.22 |
| 4,120,721 | 10/1978 | Ketley et al. | 204/159.22 |
| 4,234,676 | 11/1980 | Hein et al. | 204/159.12 |
| 4,283,480 | 8/1981 | Davies et al. | 204/159.19 |
| 4,340,707 | 7/1982 | Quis et al. | 204/159.22 |

FOREIGN PATENT DOCUMENTS 64329 5/1975 Japan .

*Primary Examiner*—Herbert J. Lilling
*Attorney, Agent, or Firm*—Antonelli, Terry & Wands

[57] ABSTRACT

A radiation curable pressure-sensitive adhesive composition comprising 100 parts by weight of a liquid oligomer having one or more acrylic unsaturated double bonds in its molecule, 0.2 to 20 parts by weight of a thiol compound and 0.5 to 30 parts by weight of acrylic monomer has high cohesion and is excellent in adhesiveness.

5 Claims, No Drawings

RADIATION CURABLE PRESSURE-SENSITIVE ADHESIVE COMPOSITION

BACKGROUND OF THE INVENTION

This invention relates to a radiation curable pressure-sensitive adhesive composition which has high cohesion and is excellent in adhesiveness.

For allowing pressure-sensitive adhesive tapes to exhibit their adhesion characteristics such as the desired cohesion, peel strength, etc., it has heretofore been necessary to use a polymer having a relatively high molecular weight and viscosity (e.g., natural rubber, synthetic rubber, etc.). Therefore, in coating, the polymer should be applied to a substrate in the form of a solution in an organic solvent, and since a large amount of the solvent used is allowed to evaporate, a long period of time is required for a drying step after the coating. Moreover, solvents used for the above-mentioned purpose are volatile and flammable and many of them have harmful effects on human body; therefore their empolyment often causes a fire or various environmental pollution problems. Further, a solvent-recovering apparatus which is said to be provided inevitably from the viewpoint of economics and preventing the above-mentioned environmental pollution is generally expensive and requires a wide space for its provision. Accordingly, in recent years, making a pressure-sensitive adhesive solventless has come to be noted from the viewpoint of the so-called saving-resources, saving-energy and preventing-environmental pollution. As counter-plans for making a non-solvent, there are adhesives of emulsion type, hot melt type and otherwise, but in purticular, radiation curable pressure-sensitive adhesives using a liquid oligomer having one or more unsaturated double bonds in its molecule are highlighted. Reasons for this are as follows. The radiation curable pressure-sensitive adhesives can be produced in the form of the so-called solventless adhesives containing, in principle, no organic solvent which is a defect of the solution type pressure-sensitive adhesives described above, or only a small amount of an organic solvent, if any. And they are characterized in that (1) their curing (polymerization) reaction is rapid because radiation which is an actinic energy ray is used, (2) the usable life can be controlled freely because the curing reaction proceeds only during irradiation, and (3) for their production, no large dryer is needed.

However, even the radiation curable pressure-sensitive adhesives have the following defects. In general, the polymerization (curing) reaction proceeds to unsaturated double bonds by a radical produced after irradiation, but the reaction rate is so rapid to cause excessive crosslinking. As a result, the glass transition temperature is raised. Therefore, the resulting film is brittle, and in an extreme case, serious polymerization shrinkage occurs, so that the film is cracked. When the film characteristics in this condition are evaluated, the film has high tensile strength but shows almost no elongation and no rubber-like properties. On the other hand, when the absolute amount of unsaturated double bonds in the molecule is decreased in order to inhibit the excessive crosslinking, the reaction proceeds locally, so that no sufficient cohesion can be obtained as a whole.

As described above, it has been difficult to control the curing reaction appropriately and allow to retain their adhesion characteristics as pressure-sensitive adhesives.

SUMMARY OF THE INVENTION

The present inventors have found that, by addition of a chain transfer agent to a liquid oligomer, the curing (polymerization) reaction becomes not local but uniform, yielding a product having excellent rubber-like properties, and that in this case, a pressure-sensitive adhesive having still higher cohesion and peel strength can be obtained by using a certain polar monomer in combination with the chain transfer agent, whereby this invention has been accomplished.

That is to say, this invention provides a radiation curable pressure-sensitive adhesive composition comprising 100 parts by weight of a liquid oligomer having one or more acrylic unsaturated double bonds in its molecule, 0.2 to 20 parts by weight of a thiol compound and 0.5 to 30 parts by weight of an acrylic monomer having an acidic group.

DESCRIPTION OF THE PREFERRED EMBODIMENTS

The liquid oligomer having acrylic unsaturated double bonds in its molecule used in this invention is one in which one or more acryloyl groups or methacryloyl groups are attached to its side chains or both ends of the main chain. The main chain comprizing an acrylic ester as a constitutive unit is particularly preferred.

Such a liquid oligomer can be synthesized by the following processes.

(1) A process which comprises copolymerizing an acrylic ester compound, a monomer having a carboxyl group and if necessary, other monomers in a suitable organic solvent by a conventional solution polymerization method, and then reacting a part of the carboxyl groups of the resulting copolymer with a monomer having an epoxy group in the presence of a polymerization inhibitor and a catalyst to introduce one or more olefinic unsaturated bonds to the side chains.

(2) A process which comprises copolymerizing an acrylic ester compound, a monomer having an epoxy group and if necessary, other monomers as mentioned above, and then reacting a part of the epoxy groups of the resulting copolymer with a monomer having a carboxyl group in the same manner as described above to introduce one or more olefinic unsaturated bonds into the side chains.

(3) A process which comprises copolymerizing an acrylic ester compound, a monomer having a hydroxyl group and if necessary, other monomers as mentioned above, and then reacting a part of the hydroxyl groups of the resulting copolymer with a 1:1 addition reaction product of a diisocyanate such as tolylene diisocyanate or hexamethylene diisocyanate and a monomer having a hydroxyl group (a half urethane) in the same manner as described above to introduce one or more olefinic unsaturated bonds into the side chains.

(4) A process according to (1), (2) and (3), wherein a monomer having an amino group is substituted for a part of the above-mentioned monomer having a carboxyl group in (1), monomer having an epoxy group in (2) and monomer having a hydroxyl group in (3).

The acrylic ester compound to be used includes, for example, methyl acrylate, methyl methacrylate, ethyl acrylate, ethyl methacrylate, butyl acrylate, butyl methacrylate, isobutyl acrylate, isobutyl methacrylate, octadecyl acrylate, octadecyl methacrylate, 2-ethylhexyl acrylate, 2-ethylhexyl methacrylate, etc. In this invention, it is preferable that such an acrylic ester compound is present in the main chain of the oligomer in an amount of 60% by weight or more.

The monomer having a carboxyl group includes, for example, acrylic acid, methacrylic acid, etc. The monomer having an epoxy group includes, for example, glycidyl acrylate, glycidyl methacrylate, etc. The monomer having a hydroxyl group includes, for example, 2-hydroxyethyl acrylate, 2-hydroxyethyl methacrylate, 2-hydroxypropyl acrylate, 2-hydroxypropyl methacrylate, etc. Further, the monomer having an amino group includes, for example, dimethylaminoethyl acrylate, dimethylaminoethyl methacrylate, diethylaminoethyl acrylate, diethylaminoethyl methacrylate, etc.

The oligomer to be used in this invention is preferably one which has a molecular weight in the range from $3 \times 10^3$ to $5 \times 10^4$ as measured by high-speed liquid chromatography which is an ordinary measurement method and a viscosity in the range from $10^2$ cps to $5 \times 10^5$ cps at room temperature. When the molecular weight is lower than $3 \times 10^3$, the resulting coating film is hard and brittle, and when the molecular weight exceeds $5 \times 10^4$, the viscosity increases, so that coating becomes difficult. Therefore, both are not desirable. Although such a liquid oligomer is applied to a substrate usually in a nonsolvent condition, a small amount of a solvent may be added if necessary.

The thiol compound to be used in this invention includes aliphatic monomer thiols such as butyl mercaptan, lauryl mercaptan, octyl thioglycollate, ethanediohiol, hexamethylenedithiol, decamethylenedithiol, tolylene-2,4-dithiol and the like; certain poly-thiols such as thiol terminated ethylcyclohexyl-di-mercaptan polymers and the like; ester-containing thiol compounds such as ethylene glycol bis(thioglycolate), ethylene glycol bis($\beta$-mercaptopropionate), trimethylolpropane tris(thioglycolate), trimethylolpropane tris($\beta$-mercaptopropionate), pentaerythritol tetrakis(thioglycolate), pentaerythritol tetrakis($\beta$-mercaptopropionate) and the like; etc. As the thiol compound, bifunctional, trifunctional or higher polyfunctional polythiols are preferred from the viewpoint of prevention of a bad odor of the unreacted thiol compound. These thiol compounds may be used alone or as a mixture thereof.

The thiol compound is added in order to inhibit excessive crosslinking by irradiation, and for this purpose, it is necessary to add the thiol compound in an amount of 0.2 to 20 parts by weight, preferably 2 to 15 parts by weight per 100 parts by weight of the liquid oligomer. When this amount is less than 0.2 part by weight, the crosslinking inhibiting effect is insufficient, and when it exceeds 20 parts by weight, the curing is insufficient, so that the cohesion is insufficient, resulting in adverse influence on the adhesion characteristics.

The acrylic monomer having an acidic group as an indispensable component used in this invention includes acrylic acid, methacrylic acid, acryloyloxyethyl hydrogenphthalate, 2-acrylamide-2-methylpropane-sulfonic acid 3-chloro-2-acidophosphoxypropyl methacrylate, 2-acidophosphoxyethyl acrylate, 2-acidophosphoxypropyl methacrylate, di(2-methacryloyloxyethyl) phosphate, di(2-acryloyloxyethyl) phosphate, etc. These acrylic monomers can be used alone or as a mixture thereof.

The acrylic monomer having an acidic group is used in an amount of 0.5 to 30 parts by weight per 100 parts by weight of the liquid oligomer. When this amount is less than 0.5 part by weight, the effect on interfacial tension is insufficient, while when it exceeds 30 parts by weight, the radiation curability and the physical properties of cured coating film are undesirably lowered.

The adhesive composition according to this invention basically comprises the constitutents described above, though in some cases, it may contain one or more conventionally used tackifiers, softeners, anti-oxidants, fillers, pigments and the like, depending on purposes.

The radiation used in this invention is an actinic energy ray including an ionizing radiation such as $\alpha$-rays, $\beta$-rays, $\gamma$-rays, neutron rays, accelerated electron beam or the like. The ionizing radiation can be used in a dose in the range from 0.5 to 50 Mrad, though the dose is preferably about 1 to 20 Mrad. If necessary, a curing accelerator can be incorporated into said composition, but in the case of irradiation with radiation, particular care should be taken in irradiation atmosphere. That is to say, since the radicals produced are inhibited by oxygen in the air, replacement of air with an inert gas such as nirtogen gas is carried out if necessary, but it is also possible to coat the coating film with a film or the like to remove oxygen.

Although the action of the thiol compound and the acrylic monomer are not clearly known, it can be considered that since the thiol compound functions as a chain transfer agent, it seems to allow the crosslinking reaction of unsaturated double bonds of the oligomer to proceed uniformly, to inhibit local intermolecular crosslinking and to impart rubber-like elasticity to the adhesive, and the interfacial tension seems to be enhanced by the acidic group of the acrylic monomer, so that the adhesion is increased.

This invention is explained below referring to Examples, in which all parts are by weight unless otherwise specified.

EXAMPLE 1 and COMPARATIVE EXAMPLES 1 and 2

A solventless acrylic oligomer was synthesized by block-polymerizing 80 parts of butyl acrylate and 20 parts of glycidyl methacrylate in the presence of a catalyst. The viscosity of the resulting liquid oligomer was $5 \times 10^4$ centipoises (30° C.). Subsequently, 10 parts of acrylic acid was subjected to addition reaction with the oligomer to synthesize a radiation curable liquid acrylic oligomer having an acryloyl group in its side chain. To 100 parts of this oligomer were added 8 parts of lauryl mercaptane as thiol compound and 5 parts of acidophosphoxyethyl methacrylate (HOSMER M, a trade name, manufactured by Yushi Seihin K. K.) to produce a radiation curable pressure-sensitive adhesive composition.

Next, a comparison of film characteristics was made by using the same composition except for omitting the aforesaid lauryl mercaptane as Comparative Example 1 and the same composition except for omitting the aforesaid acidophosphoxyethyl methacrylate as Comparative Example 2.

The films were formed by applying each composition to a release paper to a given thickness (about 1 mm) and irradiating the same with electron beam at a dose of 5 Mrad with an accelerated voltage of 160 kV and a beam current of 10 mA in a nitrogen gas atmosphere (oxygen concentration: 500 ppm) from a linear filament type electron beam irradiation apparatus (Electron Curtain, a trade name, manufactured by Energy Science Inc.) to polymerize and crosslink the same. The elongation and tensile strength of each film were measured by means of a tension meter.

The results were as shown in Table 1. The rate of tention was 200 mm/min (20° C.).

TABLE 1

| Example No. | Example 1 | Comparative Example 1 | Comparative Example 2 |
|---|---|---|---|
| Elongation (%) | 820 | 450 | 800 |
| Tension strength (kg/cm$^2$) | 5.55 | 5.85 | 5.45 |

It was found that the composition of Example 1 had rubber-like properties sufficiently. Therefore, adhesive tapes were produced by applying each composition to a polyester film of 0.025 mm in thickness (Lumilar #25, a trade name, manufactured by Toray Industries, Inc.) so that the thickness of the adhesive layer would become 0.015 mm, and irradiating the composition with electron beam in the same manner as described above, and the peel strength and cohesion were measured. The results are shown in Table 2.

TABLE 2

| Example No. | Example 1 | Comparative Example 1 | Comparative Example 2 |
|---|---|---|---|
| Initial peel strength (1) (g/25 mm) | 450 | 300 | 320 |
| Change of peel strength with the lapse of time (2) | 105 | 110 | 108 |
| Coheasion test (3) (mm/10 × 20 mm) | 0.02 | 0.03 | 0.02 |

Note:
(1) Measured according to JIS-C-2107. (An object to which the tape was adhered: SUS 430 BA plate)
(2) Heat accelerating test at 65° C. was carried out for 7 days, and the increase of adhesion is shown in terms of percentage. (The smaller the increase, the better the tape).
(3) By use of a phenol resin plate, the slide distance after 30 minutes under the conditions of a load of 500 g and a temperature of 20° C. was measured.

From the results, it is evident that since the adhesive tape of Example 1 has constant cohesion and undergoes only a slight change with the lapse of time, the composition of Example 1 is a pressure-sensitive adhesive excellent in characteristics.

EXAMPLE 2 and COMPARATIVE EXAMPLES 3 and 4

A radiation curable liquid acrylic oligomer was synthesized by reacting 50 parts of ethyl acrylate, 40 parts of 2-ethylhexyl acrylate and 10 parts of glycidyl methacrylate in the same manner as in Example 1, and adding 5 parts of acrylic acid to the resulting polymer.

To this oligomer were added 10 parts of trimethylolpropane tris(thioglycolate) and 10 parts of acryloyloxyethyl hydrogenphthalate to produce a radiation curable pressur-sensitive adhesive composition. Next, the same composition except for omitting the trimethylolpropan tris(thioglycolate) was prepared as Comparative Example 3, and the same composition except for omitting the acryloyloxyethyl hydrogenphthalate was prepared as Comparative Example 4.

The film characteristics of each composision were evaluated. Further, each composition was applied to a polyethylene film of 0.06 mm in thickness so that the thicknes of the adhesive layer would be 0.005 mm, and irradiated with electron beam to form an adhesive film for surface protection, characteristics of which were then evaluated.

The results are summarized in Table 3.

TABLE 3

| Example No. | Example 2 | Comparative Example 3 | Comparative Example 4 |
|---|---|---|---|
| Elongation (%) | 950 | 480 | 900 |
| Tensile strength (kg/cm$^2$) | 7.26 | 6.45 | 7.3 |
| Initial peel strength (g/25 mm) | 420 | 200 | 310 |
| Change with the lapse of time of adhesion (%) | 105 | 115 | 250 |
| Erichsen squeezing[4] test | No abnormality | Wholly peeled off | Partly peeled off |

Note: [4]A SUS plate to which each adhesive film had been attached was subjected to a 8 mm erichsen squeezing test according to JIS B7777, and the condition of spontaneous peeling-off of the film after 24 hours was observed.

It was found that as is evident from Table 3, the film of Example 2 was an adhesive film for surface protection which underwent only a slight change with the lapse of time and was good in drawability.

As described above, according to this invention, it becomes possible to provide a pressure-sensitive adhesive which has both excellent rubber-like properties and high cohesion and is excellent in adhesion characteristics by using both a thiol compound and an acrylic monomer having an acidic group in combination with a radiation curable liquid oligomer having one or more acrylic unsaturated double bonds in its molecule.

What is claimed is:
1. A radiation curable pressure-sensitive adhesive composition which comprises 100 parts by weight of a liquid oilgomer having one or more acrylic unsaturated double bonds in its molecule, 0.2 to 20 parts by weight of a thiol compound and 0.5 to 30 parts by weight of at least one acrylic monomer having an acidic group selected from the group consisting of acrylic acid, methacrylic acid, acryloyloxyethyl hydrogenphthalate, 2-acrylamide-2-methylpropane-sulfonic acid, 3-chloro-2-acidophosphoxypropyl methacrylate, 2-acidophosphoxyethyl acrylate, 2-acidophosphoxypropyl methacrylate, di(2-methacryloyloxyethyl) phosphate, and di(2-acryloyloxyethyl) phosphate.
2. A composition according to claim 1, wherein the liquid oligomer has a molecular weight of $3 \times 10^3$ to $5 \times 10^4$ and a viscosity of $10^2$ to $5 \times 10^5$ centipoises at room temperature.
3. A composition according to claim 1, wherein the thiol compound has a functionality of 2 or more.
4. A composition according to claim 1, wherein the thiol compound is at least one member selected from the group consisting of octyl thioglycollate, ethanedithiol, hexamethylenedithiol, decamethylenedithiol, tolylene-2,4-dithiol, a thiol therminated ethylcyclohexyl-di-mercaptan polymer, ethylene glycol biscthioglycolate), ethylene glycol bis($\beta$-mercaptopropionate), trimethylolpropane tris(thioglycolate), trimethylolpropane tris($\beta$-mercaptopropionate), pentaerythritol tetrakis(thioglycolate), and pentaerythiotol tetrakis($\beta$-mercaptopropionate).
5. A composition according to claim 1, wherein the liquid oligomer is obtained by copolymerizing an acrylic ester compound with at least one other polymerizable monomer, the acrylic ester compound being present in the main chain of the oligomer in an amount of at least 60% by weight.

* * * * *